Figure 1:
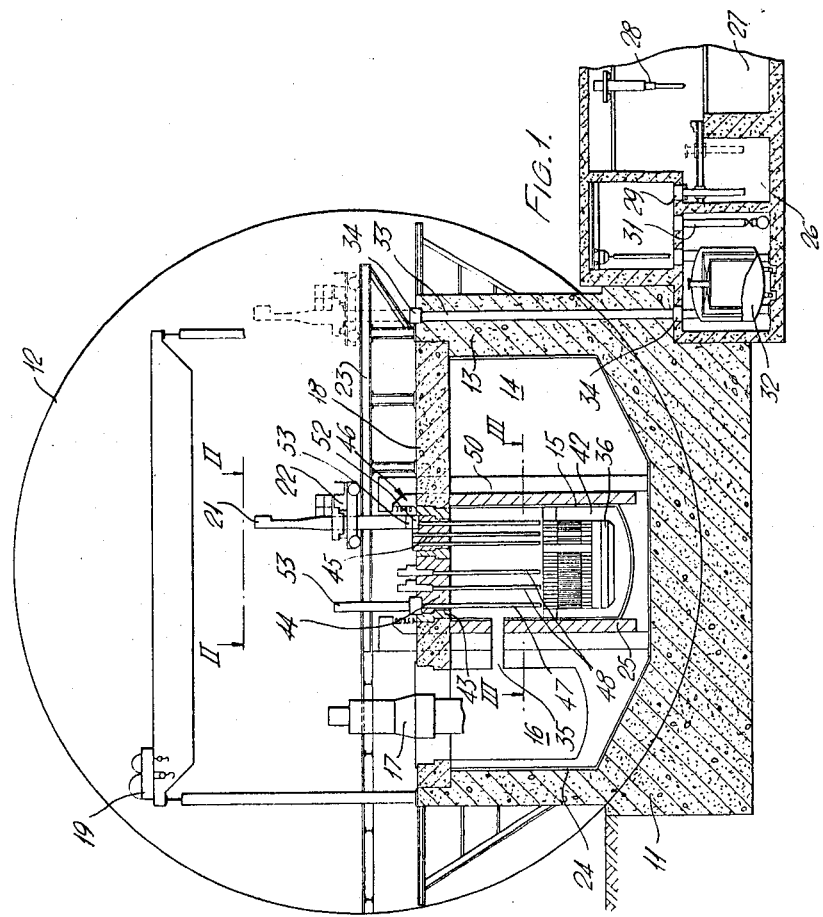

Sept. 6, 1966  W. G. HUTCHINSON ETAL  3,271,262
NUCLEAR REACTOR WITH IMPROVED FUEL HANDLING FACILITY Filed March 11, 1964  2 Sheets-Sheet 1

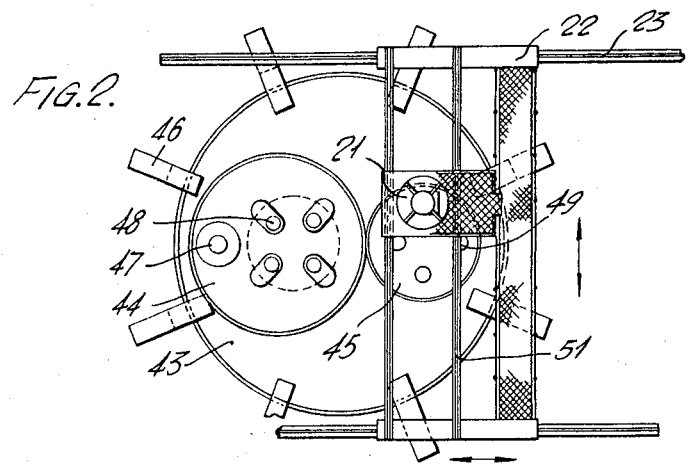
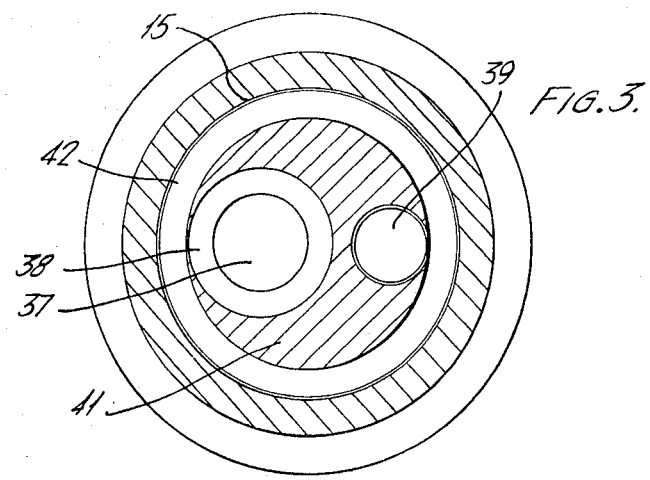
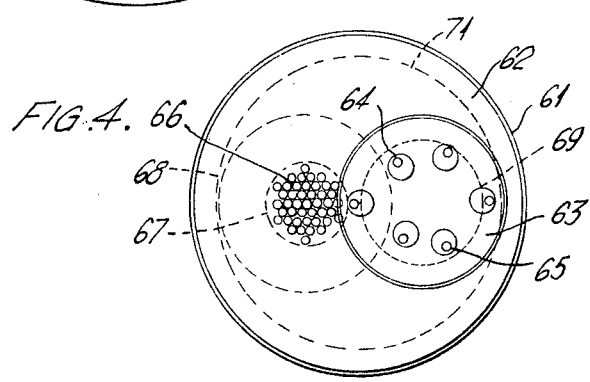

United States Patent Office 3,271,262
Patented Sept. 6, 1966

3,271,262
NUCLEAR REACTOR WITH IMPROVED FUEL
HANDLING FACILITY
William George Hutchinson, Leslie Charles Cole, and
Peter Liptrot Riley, Warrington, England, assignors to
United Kingdom Atomic Energy Authority, London,
England
Filed Mar. 11, 1964, Ser. No. 351,097
Claims priority, application Great Britain, Mar. 22, 1963,
11,421/63
7 Claims. (Cl. 176—30)

This invention relates to nuclear reactors and has one application to fast reactors in which a nuclear chain reaction is maintained by fast neutrons having unmoderated energies.

In the design of a nuclear reactor there is difficulty in providing access to a core both for control mechanisms and for fuel handling mechanisms owing to a lack of space above the core. This difficulty is particularly acute in the case of fast reactors which have cores of small dimensions.

For meeting this design difficulty, the use is contemplated of a reactor vessel top closure which includes the feature (known per se, as from U.S.A. patent specification No. 3,054,741) of an outer rotary shield carrying eccentrically an inner rotary shield having an eccentric opening for access to the core. The feature of double rotary shields can be adapted to enable interchange between the control and fuel handling mechanisms over the core; it is deemed preferable to the alternative of an offset grappling mechanism which demands a cranked suspension of a fuel handling grab and therefore does not permit a straight lift as is desirable for meeting the possibility of a fuel element becoming jammed in the core.

The present invention provides a nuclear reactor comprising a cylindrical reactor vessel, fuel element support structure within the vessel to define a core zone eccentric with respect to the vessel and a storage zone alongside the core zone, an outer rotary shield to close the upper end of the reactor vessel, an inner rotary shield carried in the outer shield for rotation about an axis which is eccentric with respect to the outer shield, a transfer mechanism carried eccentrically by the inner shield which mechanism is movable over the aforesaid zones by rotation of the inner and outer shields, and a control face provided on one of the shields from which to suspend core reactivity control mechanisms, the shields having an operational position in which the control face is located over the core zone.

It will be appreciated that the invention involves the unusual departure of having the core zone situated eccentrically in its vessel. This arises from the new approach of determining initially the positioning of the inner shield, and such other services as may be needed, relative to the core zone, and then circumscribing a minimum diameter circle as the outline of the outer shield. In this way the diameter of the reactor vessel may be kept to a minimum for a given size of core and a given service facility. Such a facility which is particularly desirable is that enabling a range of access to the storage zone without entailing movement of the control face so that the storage zone is accessible within this range during operation of the reactor. If the control face is on the inner shield, a supplementary shield in the form of a rotary charge plug is provided in the outer shield for storage zone access. If the control face is on the outer shield, then the inner shield can be used for storage zone access.

Since it is desirable that control effects should be distributed uniformly throughout the core zone, the control face preferably is capable of spanning the whole core zone and accordingly should have an area commensurate with the projected area of the core zone.

One construction of fast nuclear reactor embodying the invention and a modification thereof will now be described, by way of example, with reference to the accompanying drawings in which:

FIGURE 1 is a diagrammatic sectional view of the reactor,
FIGURE 2 is a plan view on section line II—II of FIGURE 1,
FIGURE 3 is a plan view on section line III—III of FIGURE 1, and
FIGURE 4 is a plan view similar to FIGURE 3 of the modified reactor.

A fast nuclear reactor (FIGURE 1) is supported on a concrete foundation 11 and surrounded by a pressure-tight spherical containment 12 within which concrete walling 13 defines a vault 14 housing a reactor vessel 15 and four primary heat exchanger vessels 16 grouped around the reactor vessel, each heat exchanger vessel also containing a pump 17 for circulation of reactor coolant. The vault is closed by a concrete lid 18 above which the reactor superstructure includes an overhead crane 19 and a fuel charge machine 21 which is carried by a transporter 22 running on rails 23. The concrete walling 13 which has a steel lining 24 and the concrete lid 18 provide a biological shield around the reactor vessel; within the vault a cylindrical neutron shield 25 of borated graphite encloses the reactor vessel to counter neutron irradiation of the heat exchangers and the possibility of activation of secondary coolant flowing through the heat exchangers. Outside the spherical containment a fuel handling building 26 houses a storage pond 27, a remote-operated manipulator 28, a transfer flask 29, a decontamination flask 31, and a rotary fuel magazine 32. Valves are provided to render the various chambers of the building 26 gas-tight. A charge chute 33 between the upper face of the concrete vault within the containment and the magazine 32 is provided with valves 34 at each end so that the integrity of the pressure-tight containment 12 can be maintained.

The reactor vessel 15 which is cylindrical and fabricated of stainless steel is suspended from the lid 18 and interconnected with the heat exchanger vessels 16 by radial ducts 35 which are of coaxial form each comprising an inner hot duct for outgoing reactor coolant and an outer cool duct for incoming reactor coolant. The primary reactor coolant, which takes the form of liquid sodium, is circulated through a fuel support structure 36 within the reactor vessel to abstract heat from fuel therein and delivered to the heat exchangers where it yields its heat to a secondary coolant, also liquid sodium.

The fuel support structure 36 is arranged to define three zones (FIGURE 3) comprising a cylindrical core zone 37 which is eccentric with respect to the axis of the cylindrical reactor vessel, an annular breeder zone 38 surrounding the core zone, and a storage zone divisible into a cylindrical charging zone 39 which is also eccentric with respect to the reactor vessel but on the same diameter as the core zone, and a decay zone 41 which is crescent-shaped to complete the area of the fuel support structure; an annular space 42 surrounds the fuel support structure within the reactor vessel for flow of primary reactor coolant. The fuel support structure is adapted to receive interchangeable, upright, elongate fuel elements or units, breeder units and control units, these units containing fissile material, fertile material and neutron absorbing material respectively; upper and lower breeder blankets are defined by fertile material carried at the ends of the fuel units. It is arranged that cool primary coolant at high pressure entering the reactor vessel passes downwards through separate ducts in the annular space 42, and then upwards through the various zones as defined by the support structure 36. In a proposed fuel cycle, fresh fuel units are charged into the charging zone 39 thence to be transferred to the core zone whilst irradiated fuel units are transferred to the decay zone 41 for cooling during their decay and decayed fuel units are transferred from the decay zone to the charging zone thence to be discharged from the reactor vessel.

The reactor vessel is closed by an outer rotary shield 43 (FIGURE 2) which carries an eccentric inner rotary shield 44 and an eccentric rotary charge plug 45. The two shields and the plug, which may be of steel-lined concrete or steel and graphite, complete the biological shield around the reactor core. The outer rotary shield has a diameter roughly equal to that of the reactor vessel and is mounted on bearings to permit it to be rotated about its own central axis; it is shown in FIGURE 2 in its position for operation of the reactor. Upward movement of the outer shield is restrained by energy dissipation devices 46; these (shown diagrammatically in FIGURE 1) may take the form of superimposed metal tubes, which are flattened by upward movement of the outer shield, or any conventional energy absorber and may act between the shield and upright pillars spaced around the reactor vessel. These devices serve to restrain possible upward movement of the rotary shields under the effect of a pressure surge within the reactor vessel, such as might result from an uncontrolled incident within the reactor core.

The inner rotary shield has an area greater than the area of the core zone over which it is positioned when the outer rotary shield is in its operational position. This inner rotary shield is penetrated by an eccentric transfer mechanism 47 and has a control face of area which is commensurate with the projected area of the core and from which are suspended thirteen control mechanisms 48 (of which only four are shown in FIGURE 2); the distribution of the control mechanisms over the control face is such that control units can be inserted into any free space in the core zone or can be located over any such free space during reactor operation to act as shut down units. The rotary charge plug is penetrated by four charge tubes 49 located at different radii with respect to the central axis of the plug. During reactor operation the charge plug is located over the charge zone and, by rotation of the plug in this position, one of the charge tubes can be located over any fuel unit position in the charge zone. The charge machine 21 can be positioned over any one of the charge tubes by movement of the transporter. Each charge tube is fitted with a valve 52 (FIGURE 1) and a corresponding valve 53 is carried by the charge machine. By virtue of these values, the charge machine can be coupled to a charge tube and employed for charge and discharge of fuel units during reactor operation. A transfer machine 53 is coupled to the transfer mechanism 47 for the purpose of transferring fuel units between the core zone, the decay zone and the charge zone. This operation, involving rotation of the inner and outer rotary shields, can only be undertaken when the reactor is shut down since, prior to rotation of the inner shield, the control mechanisms must be disconnected from the control units which can be left in the core.

In a modification of the fast nuclear reactor described above, a cylindrical reactor vessel 61 (FIGURE 4) is closed by an outer rotary shield 62 which carries a single eccentric inner rotary shield 63. The inner shield serves to carry a transfer mechanism 64 and five charge tubes 65. The outer rotary shield is shown in its position for reactor operation. In this position of the shield, forty three control mechanisms 66 carried by a control face on the outer shield are suspended over a reactor core zone 67 which is disposed eccentrically with respect to the cylindrical reactor vessel. As in the reactor of FIGURES 1, 2 and 3, a breeder zone 68 surrounds the core zone and a charge zone 69 is located on the same diameter, the remaining area of the fuel support structure 71 being available as a decay zone. In the operational position of the outer rotary shield the inner shield is located over the charge zone 69 and charge and discharge of fuel units into this zone can be effected by means of the five charge tubes 65 during reactor operation; the five charge tubes are located on different radii with respect to the inner shield. When the reactor is shut down, fuel units can be transferred by the transfer mechanism between the core zone, the decay zone, and the charge zone, this operation requiring rotation of the outer and inner shields and consequently requiring disconnection of the control mechanisms from their associated control units. This alternative arrangement of rotary shields for a fast reactor is simpler than the arrangement of FIGURES 1, 2 and 3 but requires a larger cylindrical reactor vessel in so far as it is necessary for the inner shield to be displaceable entirely clear of the core zone for operation of the reactor. This disadvantage may be offset to some extent by a charge zone of larger area which can also be used as a decay zone, thus reducing the number of transfer operations necessary when the reactor is shut down. It follows from this modification that the invention also provides a nuclear reactor comprising a reactor vessel with a top closure including double rotary shields, that is to say an outer rotary shield carrying eccentrically an inner rotary shield, and with fuel element support structure to define in the vessel a core zone, in which reactor the axis of rotation of the outer shield lies adjacent the peripheries of both of the core zone and the inner shield such that the latter is displaceable substantially clear of the core zone.

What we claim is:

1. A nuclear reactor comprising a cylindrical reactor vessel, fuel element support structure within the vessel to define a core zone eccentric with respect to the vessel and a storage zone alongside the core zone, an outer rotary shield to close the upper end of the reactor vessel, an inner rotary shield carried in the outer shield for rotation about an axis which is eccentric with respect to the outer shield, a transfer mechanism carried eccentrically by the inner shield which mechanism is movable over the aforesaid zones by rotation of the inner and outer shields, and a control face provided on one of the shields from which to suspend core reactivity control mechanisms, the shields having an operational position in which the control face is located over the core zone.

2. A nuclear reactor comprising a cylindrical reactor vessel, fuel element support structure within the vessel to define a core zone eccentric with respect to the vessel and a storage zone alongside the core zone, an outer rotary shield to close the upper end of the reactor vessel, an inner rotary shield carried in the outer shield for rotation about an axis which is eccentric with respect to the outer shield, a transfer mechanism carried eccentrically by the inner shield which mechanism is movable over the aforesaid zones by rotation of the inner and outer shields, control mechanisms for insertion into the core zone for reactivity control, a control face on the inner shield adapted for suspension of the control mechanisms therefrom, and a rotary charge plug disposed in the outer shield to give access through a penetration in the plug to the storage zone when the control face of inner shield is located over the core zone.

3. A nuclear reactor as set forth in claim 2, wherein the rotary charge plug has penetrations for fuel element charging and discharging at different radii with respect to the central axis of the plug.

4. A nuclear reactor comprising a cylindrical reactor vessel, fuel element support structure within the vessel to define a core zone eccentric with respect to the vessel and a storage zone alongside the core zone, an outer rotary shield to close the upper end of the reactor vessel, an inner rotary shield carried in the outer shield for rotation about an axis which is eccentric with respect to the outer shield, a transfer mechanism carried eccentrically by the inner shield which mechanism is movable over the aforesaid zones by rotation of the inner and outer shields, control mechanisms for insertion into the core zone for reactivity control, and a control face on the outer shield adapted for suspension of the control mechanisms therefrom, whereby to leave the inner shield free for access to the storage zone when the control face of the outer shield is located over the core zone.

5. A nuclear reactor as set forth in claim 4, wherein the inner shield has, in addition to the transfer mechanism, a plurality of penetrations for fuel element charging and discharging at different radii with respect to the central axis of the inner shield.

6. A nuclear reactor comprising a reactor vessel, fuel element support structure within the vessel to define a core zone, and a top closure for the reactor vessel, said top closure comprising an outer rotary shield disposed with its axis of rotation adjacent the periphery of the core zone, an inner rotary shield carried in the outer shield, the periphery of the inner shield being adjacent the axis of rotation of the outer shield whereby to enable the inner shield to be displaced substantially clear of the core zone, a transfer mechanism carried eccentrically by the inner shield which mechanism is movable to any position over the core zone by rotation of the inner and outer shields, control mechanisms for insertion into the core zone for reactivity control, and a control face on one of the shields adapted for suspension of the control mechanisms therefrom.

7. A nuclear reactor as set forth in claim 6, wherein the control face is on the outer shield and the fuel element support structure defines also a storage zone alongside the core zone, said storage zone being accessible by means of the inner shield when the control face of the outer shield is located over the core zone.

References Cited by the Examiner

UNITED STATES PATENTS

| 3,044,947 | 7/1962 | Payne | 176—30 |
| 3,054,741 | 9/1962 | Tatlock et al. | 176—30 |
| 3,169,117 | 2/1965 | Dickinson et al. | 176—40 |

FOREIGN PATENTS 822,163   10/1959   Great Britain.

L. DEWAYNE RUTLEDGE, *Primary Examiner.*

LEON D. ROSDOL, *Examiner.*